United States Patent [19]

Melsheimer

[11] 4,312,889
[45] Jan. 26, 1982

[54] LIQUID CARRIER CONCENTRATE FOR PRE-LOADED CUP

[75] Inventor: Stephen T. Melsheimer, Hatboro, Pa.

[73] Assignee: Design & Funding, Inc., Baltimore, Md.

[21] Appl. No.: 145,375

[22] Filed: Apr. 30, 1980

[51] Int. Cl.³ .................. A23L 2/00; A61K 7/22; B65B 29/06

[52] U.S. Cl. .................. 426/86; 206/217; 424/14; 424/49; 424/54; 426/96; 426/590

[58] Field of Search .............. 426/86, 590, 591, 594, 426/597, 78, 96, 103, 454; 206/217, 218; 229/1.5 B; 424/14, 27, 29, 54, 25, 49

[56] References Cited

U.S. PATENT DOCUMENTS

| | | | |
|---|---|---|---|
| 1,592,395 | 7/1926 | Sulzberger | 426/86 |
| 1,770,118 | 7/1930 | Williams | 426/86 |
| 1,889,111 | 11/1932 | Serr | 426/86 |
| 2,062,897 | 12/1936 | Michel et al. | 426/86 |
| 2,432,759 | 12/1947 | Heyman | 426/594 |
| 2,851,359 | 9/1958 | Diller | 426/591 |
| 2,851,361 | 9/1958 | Diller | 426/591 |
| 2,889,226 | 6/1959 | Hinkley | 426/594 |
| 2,963,368 | 12/1960 | Greenbaum | 426/597 |
| 3,202,275 | 8/1965 | Loughary | 426/86 |
| 3,252,803 | 5/1966 | Belasco | 426/86 |
| 3,480,185 | 1/1969 | Steinberg | 426/591 |
| 3,518,343 | 6/1970 | Welsh et al. | 426/591 |
| 3,518,344 | 6/1970 | Welsh et al. | 426/591 |
| 3,526,316 | 9/1970 | Kalogris | 426/86 |
| 3,598,609 | 8/1971 | Hoynak | 426/590 |
| 3,627,583 | 12/1971 | Troy et al. | 426/590 |
| 3,651,207 | 3/1972 | Lauster et al. | 425/54 |
| 3,755,529 | 8/1973 | Procyk | 426/591 |
| 3,869,555 | 3/1975 | Hednis | 426/594 |
| 3,930,053 | 12/1975 | Japikse et al. | 426/590 |
| 4,137,303 | 1/1979 | Gaffar et al. | 424/54 |

Primary Examiner—Steven L. Weinstein

[57] ABSTRACT

An improved concentrate for pre-loaded dispenser cups whose contents are diluted with water prior to use wherein the concentrate includes a non-volatile, water miscible liquid or powdered solid wetting agent. Glycerine is a suitable liquid wetting agent. Polyethylene glycol 20M is a suitable powdered solid wetting agent. The concentrate may be placed in the cup either as a slurry of solids in a liquid, as a powdered solid, or as a powdered solid adhered to a layer of gelatin contained in the cup.

6 Claims, 1 Drawing Figure

U.S. Patent     Jan. 26, 1982     4,312,889
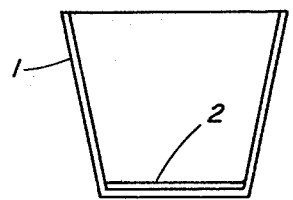
FIGURE

LIQUID CARRIER CONCENTRATE FOR PRE-LOADED CUP

FIELD OF THE INVENTION

The invention relates to the composition of the concentrate in pre-loaded cup dispensers to which water is added prior to use.

BACKGROUND OF THE INVENTION

In the prior art of cups having pre-loaded quantities of concentrate material which is diluted with water prior to use, the following patents are noted: U.S. Pat. No. 2,062,897 of Michel et al; U.S. Pat. No. 3,202,275 of Loughary; and U.S. Pat. No. 3,252,803 of Belasco. Michel et al show cups having dry, carrier-free concentrates which are diluted with water just prior to use. Loughary describes a powdered concentrate material which is mixed with water for application to the cup and then dried to remove the liquid water carrier. Belasco discloses that dry, powdered material is adhered to the surface of the cup by employing an edible oil.

In all of the above pre-loaded cup articles, several unsolved problems persist. Dissolving or suspending a dried powdery material, especially a compacted material, is difficult because the powder is not easily wetted by water which has a high surface tension. An oil-powder concentrate suspension is not readily effectively diluted by water because of the immiscibility of the water-oil combination.

In view of the above, it is an object of the invention to provide a powdered or liquid concentrate having improved dilutability by employing a non-volatile, water miscible, stable liquid or powdered solid carrier.

Another object of the invention is to provide a non-volatile, water miscible liquid or powdered solid carrier for a concentrate which is stable with respect to the ingredients of the concentrate.

Another object is to provide a water miscible liquid or powdered solid carrier for a concentrate such as used in a preloaded cup having a surface tension substantially less than that of water.

Another object is to provide a concentrate for a pre-loaded cup having the powdered ingredients wetted by a water miscible, non-volatile liquid wetting agent.

Another object of the invention is to provide a water miscible liquid carrier which is non-volatile and will not evaporate on standing.

Another object is to provide a concentrate for a pre-loaded cup having the powdered active ingredients blended with a powdered, water miscible wetting agent.

SUMMARY OF THE INVENTION

The invention is an improved concentrate for pre-loaded dispenser cups whose contents are diluted with water just prior to use wherein the concentrate includes a non-volatile, water miscible, stable liquid or powdered solid carrier. The liquid carrier wets the powdered concentrate material and has a surface tension substantially less than that of water. Glycerine is a suitable liquid carrier. The powdered solid carrier is a non-volatile, water miscible wetting agent such as polyethylene glycol 20 M.

The invention also includes methods for applying a concentrate containing a liquid or powder wetting agent to the interior of the cup.

A powder concentrate is slurried with a liquid wetting agent and added to a cup as a slurry. Alternatively, a powder concentrate is coated with a liquid wetting agent and even being coated with a liquid still retains its powdery consistency. As a liquid-coated powder, the powder concentrate is sprayed into a cup in its powdered state.

A powder concentrate may be blended with a powdered solid wetting agent as carrier. The powder blend is then sprayed as a powder into a cup. Alternatively, the bottom of a cup is sprayed with a mix of gelatin and water. When the gelatin has almost occurred, a powder blend is sprinkled into the cup.

DETAILED DESCRIPTION OF THE INVENTION

In the FIGURE, cup 1 contains a quantity of concentrate 2 at the bottom. The concentrate may be a medication, an oral cleanser or mouthwash, or a confection. When water is added, the concentrate is diluted. Dilution is effected just prior to use. Water is well known to possess a high surface tension. *Lange's Handbook of Chemistry, 11th Edition* lists the surface tension of selected materials with reference to air on pages 10-264,5. The surface tension of water at 20 degrees C. is 72.75 dynes per centimeter. The high surface tension of water impedes its ability to wet a powdered concentrate of active ingredients, especially a compacted powder, in a pre-loaded cup. The surface tension of glycerol (a synonym for glycerine) is listed as being 63 dynes per centimeter which is substantially less that that of water. As a result, glycerine has an enhanced ability to wet powdered concentrates. When glycerine is slurried with powdered ingredients of a concentrate, the powdered material is easily wetted by the glycerine. In addition to its property of being a good wetting agent for powders, glycerine is non-volatile. It will not evaporate upon standing. Thus, a powder that is slurried with glycerine will remain in the slurried condition for an extended period of time. Another property of glycerine is its miscibility with water. Just prior to use when water used as a diluent is added to a concentrate of a powder slurried with glycerine, the water and the glycerine readily mix thereby resulting in a rapid and thorough dilution of the concentrate. Another property of glycerine is its chemical stability in the presence of concentrate active ingredients used in a pre-loaded cup. As an example, a formulation for a pre-loaded mouthwash concentrate includes sweeteners, an antiseptic, flavoring, food coloring, an antioxidant, and an effervescent material such as sodium bicarbonate. Glycerine is stable with respect to all these ingredients in admixture.

For a concentrate having a liquid wetting agent carrier, the concentrate may be added to the cup in a variety of conventional ways. Techniques such as brushing, spraying, and pouring may be used. If desired, a small amount of water may be added to the concentrate in order to decrease its viscosity prior to addition of the concentrate to the cup. The water would be allowed to evaporate, however, before the pre-loaded cup would be ready for packaging. Aside from glycerine, other liquid wetting agents may be used. These include liquid polyoxyethylene polymers and other nonionic liquid wetting agents.

An alternative technique for applying a powdered concentrate employing a liquid wetting agent to a cup is as follows. The powdered ingredients of a concentrate are blended with a liquid wetting agent. The proportions of the powdered ingredients and the liquid wetting agent are such that the powdered ingredients are coated with a thin film of liquid wetting agent but still retain their powdery consistency. The powdered concentrate, whose particles are coated with a thin film of liquid wetting agent, are sprayed into a cup in their powdered state.

EXAMPLE I

A specific mouthwash concentrate employing a liquid wetting agent carrier is as follows:

| | |
|---|---|
| Saccharine, sodium | 0.05% |
| Cetyl pyridinium chloride | 0.05% |
| Flavor (e.g. lime) | 0.10% |
| Menthol | 0.05% |
| Food coloring | 0.01% |
| Sorbitol | 2.00% |
| Sodium benzoate | 0.02% |
| Sodium bicarbonate | 5.00% and |
| Glycerine | 2.00% | wherein the %'s are by weight of the total dilution, the balance from 100% being water. It is noted that the glycerine is approximately 21% by weight of the concentrate, the balance from 100% being the other ingredients of the concentrate. This amount of glycerine can be extended to a range from 16–26% by weight of the concentrate.

In loading a cup with the above formulation, a little water is added to the formulation to give the concentrate flowing properties into the cup. For a 2 ounce cup, 1 to 3 grams of the concentrate are added to the cup.

For a concentrate having a powdered solid wetting agent carrier, the concentrate containing the powder wetting agent carrier such as polyethylene glycol 20 M, another suitable solid polyoxyethylene polymer, or any other suitable powder wetting agent may be added to the cup in the following exemplary ways. In one method, a blend of powder concentrate and powder wetting agent is sprayed into a plain cup. Alternatively, the bottom of a cup is first sprayed with a mixture of gelatin and water. Before the gelatin has gelled, the powder blend is sprinkled into the cup.

EXAMPLE II

A specific mouthwash concentrate employing a powdered wetting agent carrier is as follows:

| | |
|---|---|
| Cetyl pyridinium chloride, U.S.P. | 0.18% |
| Sodium lauryl sulfate, U.S.P. | 0.18% |
| Saccharine, sodium, U.S.P. | 0.30% |
| Dry flavoring | 2.00% |
| Dry food coloring | 0.04% |
| Carboxymethyl cellulose (high viscosity) | 1.80% and |
| Polyethylene glycol 20M, U.S.P. | 90.23% | wherein the %'s are by weight of the concentrate, the balance from 100% being a small amount of water. The amount of polyethylene glycol 20 M can be extended to a range from 80–95% by weight of the concentrate. For a 2 ounce cup, ½ to 1 gram of the concentrate is added to the cup.

The formulation above is obtained by mixing the ingredients in the order listed in a dry powder blender. After flavoring is added, excessive tumbling is to be avoided as the encapsulated flavors may be released.

A method for adhering the above formulation to the bottom of a cup as is follows. The bottom of the cup is sprayed with a hot mix of gelatin and water. When the gelatin has just about set up, dry mix is sprinkled in.

The foregoing has described several embodiments of the invention of a concentrate material having a non-volatile, water miscible wetting agent as an ingredient. The concentrate is used in a pre-loaded cup to which water is added just prior to use. The concentrate may be a slurry of solids in a liquid, a liquid-coated powder, or a blend of substantially dry powders. A wide variety of liquid and powdered solid wetting agents may be employed. A variety of methods of applying the concentrate to the cup may be employed.

The embodiments described above are not intended to limit the scope of the invention which is defined in the claims.

What is claimed is:

1. An article for dispensing a pre-loaded concentrate upon dilution, comprising:
    a cup; and
    a concentrate contained within said cup wherein said concentrate includes the non-volatile, water miscible, liquid wetting agent, glycerine in an amount sufficient to serve as a wetting agent so that when water is added as a diluent to the concentrate, rapid dilution of the concentrate results.

2. An article as described in claim 1 wherein said glycerine is in the range from 16–26% by weight of the concentrate.

3. An article as described in claim 1 wherein said concentrate is comprised of:

| | |
|---|---|
| Saccharine, sodium | 0.05% |
| Cetyl pyridinium chloride | 0.05% |
| Flavor | 0.10% |
| Menthol | 0.05% |
| Food coloring | 0.01% |
| Sorbitol | 2.00% |
| Sodium benzoate | 0.02% |
| Sodium bicarbonate | 5.00% and |
| Glycerin (the wetting agent) | 2.00% | wherein the %'s are by weight of the total dilution, the balance being water.

4. An article as described in claim 1 wherein said concentrate is in the form of a slurry of solids in the liquid wetting agent glycerine.

5. An article as described in claim 1 wherein said concentrate is in the form of a powder.

6. An article as described in claim 5 wherein said powder has a coating of the liquid wetting agent glycerine.

* * * * *